United States Patent
Gonçalves Martins et al.

(10) Patent No.: US 11,524,884 B2
(45) Date of Patent: Dec. 13, 2022

(54) BEVERAGE DISTRIBUTION SYSTEM WITH ERGONOMIC RETENTION OF DRINKING RECIPIENTS, AND PROCESS OF OPERATION THEREOF

(71) Applicant: NOVADELTA—COMÉRCIO E INDÚSTRIA DE CAFÉS, LDA, Lisbon (PT)

(72) Inventors: Marco Filipe Gonçalves Martins, Pedreiras Pedreiras (PT); Rui Miguel Nabeiro, Campo Maior (PT); João André De Figueiredo Branco, Moscavide (PT)

(73) Assignee: NOVADELTA—COMÉRCIO E INDÚSTRIA DE CAFÉS, LDA, Lisbon (PT)

( * ) Notice: Subject to any disclaimer, the term of this patent is extended or adjusted under 35 U.S.C. 154(b) by 0 days.

(21) Appl. No.: 17/264,375

(22) PCT Filed: Jul. 30, 2019

(86) PCT No.: PCT/PT2019/050023
§ 371 (c)(1),
(2) Date: Jan. 29, 2021

(87) PCT Pub. No.: WO2020/027677
PCT Pub. Date: Feb. 6, 2020

(65) Prior Publication Data
US 2021/0300747 A1 Sep. 30, 2021

(30) Foreign Application Priority Data
Aug. 1, 2018 (PT) .......................... 110898

(51) Int. Cl.
*B67D 1/06* (2006.01)
*A47G 19/22* (2006.01)

(52) U.S. Cl.
CPC ............ *B67D 1/06* (2013.01); *A47G 19/2205* (2013.01); *B67D 2210/00062* (2013.01); *B67D 2210/00065* (2013.01)

(58) Field of Classification Search
CPC ........ B67D 1/0894; B67D 2210/00062; B67D 2210/00065; A47G 19/2205; A47G 19/2261
See application file for complete search history.

(56) References Cited

U.S. PATENT DOCUMENTS 4,538,746 A * 9/1985 Hines ................... B67D 1/0832
137/322
6,279,782 B1 * 8/2001 Hanson ................ A61C 1/0084
222/153.09

(Continued)

FOREIGN PATENT DOCUMENTS

CA 3 024 415 A1 11/2017
DE 10 2008 007 254 A1 8/2008

(Continued)

OTHER PUBLICATIONS

English Translation of Adronis (DE 10 2009 048 233).*

(Continued)

*Primary Examiner* — Timothy L Maust
(74) *Attorney, Agent, or Firm* — Sughrue Mion, PLLC

(57) ABSTRACT

A beverage distribution system for preparation of espresso coffee and similar aromatic beverages, including a drinking recipient (1, 1'), for example of glass, cup, or similar type, a beverage discharge disposition (2) operatively associated with a beverage preparation device (3), whereby the beverage discharge disposition (2) is provided so that the beverage discharge flow impinges, along a direction opposite to the gravity force and with a given flow pressure, and a flow regulation mechanism (13) on the drinking recipient (1, 1'), whereby the drinking recipient (1, 1') presents a recipient (Continued)

retention mechanism (17) provided so that the drinking recipients (1, 1') can only be placed on the recipient placement support (22) in one or two previously defined angular extensions with relation to the beverage discharge disposition (2).

20 Claims, 8 Drawing Sheets

(56) References Cited

U.S. PATENT DOCUMENTS

| | | | |
|---|---|---|---|
| 8,763,655 B2* | 7/2014 | Springer | B67D 1/06 141/113 |
| 2008/0223478 A1* | 9/2008 | Hantsoo | B67D 1/0894 141/2 |
| 2014/0102584 A1* | 4/2014 | Lasnier | B67D 7/0294 141/18 |
| 2015/0320256 A1* | 11/2015 | Kollep | A23F 3/18 426/433 |

FOREIGN PATENT DOCUMENTS

| | | | |
|---|---|---|---|
| DE | 10 2009 048 233 A1 | 4/2010 | |
| DE | 102009048233 A1 * | 4/2010 | ............ A47J 31/369 |
| EP | 1 991 094 B1 | 8/2009 | |
| EP | 2 120 652 B1 | 12/2011 | |
| EP | 2 029 470 B1 | 8/2016 | |
| WO | 2016/071880 A1 | 5/2016 | |
| WO | WO-2017200409 A1 * | 11/2017 | .......... A47J 31/4492 |

OTHER PUBLICATIONS

International Search Report of PCT/PT2019/050023 dated Nov. 28, 2019 [PCT/ISA/210].

Written Opinion of PCT/PT2019/050023 dated Nov. 28, 2019 [PCT/ISA/237].

* cited by examiner

BEVERAGE DISTRIBUTION SYSTEM WITH ERGONOMIC RETENTION OF DRINKING RECIPIENTS, AND PROCESS OF OPERATION THEREOF

CROSS REFERENCE TO RELATED APPLICATIONS

This application is a National Stage of International Application No. PCT/PT2019/050023, filed Jul. 30, 2019, claiming priority to Portuguese Patent Application No. 110898, filed Aug. 1, 2018.

FIELD OF THE INVENTION

The present invention refers to the field of beverage distribution systems, in particular systems for preparation of beverages based upon single portions of precursor edible substances, such as for example espresso coffee and similar, presenting beverage discharge means to the interior of a drinking recipient along a direction substantially opposite to the gravity force.

BACKGROUND OF THE INVENTION

It is known to provide a beverage discharge along a direction contrary to the gravity force, and through the wall of a drinking recipient.

The reliable and ergonomic retention of the drinking recipient on a respective beverage discharge disposition, providing a regulation of the beverage discharge flow, suggests several problems to be solved.

In particular, in the case of aromatic beverages, such as for example espresso type coffee, this beverage discharge is a relevant process with potential impact upon the beverage quality obtained in the drinking recipient. In fact, in particular in the case of espresso type coffee, the main characteristics of the discharge flow determines several aspects such as the production of crème and retention thereof in the cup, and the temperature variation as a result of exposition to air during the discharge to the cup.

Document EP 1991094 B1 discloses a drinking recipient adapted so that can be filled from the base and presenting a sealable base wall for such purpose, whereby the beverage is injected with enough pressure to open a valve provided as flow regulation element of beverage discharge flow.

Document EP 2029470 B1 discloses a system of the type of the present invention. In particular, the drinking recipient presents a base region adapted so that can be retained on a beverage discharge disposition, whereby said disposition presents guides configured so as to cooperate with complimentary guides on the base region of drinking recipient so as to guide the displacement of the discharge injector with relation to the recipient, by means of rotation of the recipient on said formation, so that the discharge injector penetrates in the charge opening and the single-way valve of the recipient. In particular, the exterior surface on the base region of beverage recipient, presents two guide formations configured in form of "L" that develops along a direction transversal to the gravity force, whereby said guide formations operate with corresponding projections of tooth type provided on a surface of said beverage discharge disposition. From said disposition results that a glass can be placed at a first angular position and manually rotated afterwards along a given angular direction and by a given angle until a second angular position where it gets retained, and vice-versa for releasing the glass after beverage discharge.

Document EP 2120652 B1 discloses another system of the type of the present invention, whereby the base region of said drinking recipient can be retained by means of a thread on a placement disposition configured as brewing device so that can collect a capsule containing a beverage percussing edible substance, downstream of the fluid discharge and upstream of base portion of drinking recipient. Moreover, the base region of said placement disposition presents three transversal projections developing inwards that, in correspondence with three transversal projections associated with a fluid discharge disposition and developing outwards, provide the placement and retention of said placement disposition on the fluid discharge disposition by means of rotation of said placement disposition around a respective central axis, thereby providing connection in fluid communication of the upstream fluid discharge with the drinking recipient downstream.

Said placement disposition by fitting can be associated with the base region of a drinking recipient, for example a coffee cup, notably by means of a connection of thread type, and be adapted so that provides retention in removable manner on said beverage discharge support, in particular by means of placement and actuation of an element of mechanical engagement with an engagement portion on the base region of said placement disposition.

Said placement disposition by fitting presents a flow regulation disposition that provides flow passageway when the placement disposition is placed on a fluid discharge disposition, so that the flow regulation disposition is mechanically actuated by a corresponding projection in the beverage discharge support to allow flow passageway.

GENERAL DESCRIPTION OF THE INVENTION

The objective of the present invention is to provide a beverage distribution system presenting a beverage discharge disposition that provides the pressurized injection of beverage discharge flow into the interior of a drinking recipient along a direction opposite the gravity force, through a base region of said drinking recipients, the system being adapted so that can provide recipients of simpler construction, integrating at least one of flow regulation means, flow constrain means and flow sealing means, with more reliable and effective retention of the base portion of the drinking recipient on a respective beverage discharge disposition.

This objective is solved according to the present invention by means of a beverage preparation system according to claim 1, whereby preferred embodiments are described in the secondary claims.

In particular, the objective above is solved by means of a system whereby the drinking recipient and the beverage discharge disposition are adapted so that the placement position is only provided in one or two previously defined angular positions of said drinking recipients with relation to said beverage discharge disposition, as well as with the support of at least most part of the downwards-oriented free surface of the base wall of the drinking recipient upon an upwards-oriented surface of central support portion of said beverage discharge disposition, so that provides a substantial support of said drinking recipient, and further a compression of an exterior portion of the flow regulation means that extends around the beverage discharge element, so as to reinforce the sealing of the interface between drinking recipient and beverage discharge element.

Said drinking recipient presents flow regulation means adapted so that only provide flow passage if the flow pressure is bigger than a previously defined value, and that are disposed aligned with said beverage discharge element, at least on a retention position whereby said drinking recipient is retained on said recipient placement surface.

The system can include a plurality of different types of drinking recipients that present retention regions of similar dimensions and similar retention means, and differ in at least one of shape and dimension of the collection space of said first material part, construction material of at least one of said recipient parts, flow regulation means, flow constrain means and flow sealing means.

The system can provide the preparation of at least one type of beverage, including at least one brewing device, adapted for collecting a single portion of edible substance, optionally provided inside of a respective capsule, preferentially for the preparation of espresso-like coffee and other aromatic beverages.

Another objective of the present invention is to provide a process of preparation of beverages including the use of a drinking recipient and of a beverage discharge disposition, whereby the beverage discharge flows through a base region of said drinking recipient, so that the retention of drinking recipient is provided in more ergonomic manner.

This objective is solved according to the present invention by means of a process of preparation of beverages according to claim 16, whereby preferred embodiments are described in the secondary claims.

DESCRIPTION OF THE FIGURES

The invention shall hereinafter be explained in greater detail based upon preferred embodiments and on the attached

FIGURES

Figure 1:
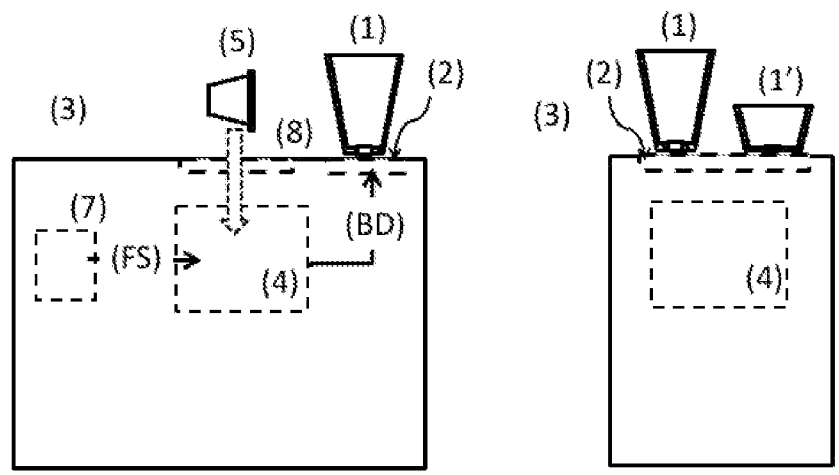
Figure 2:
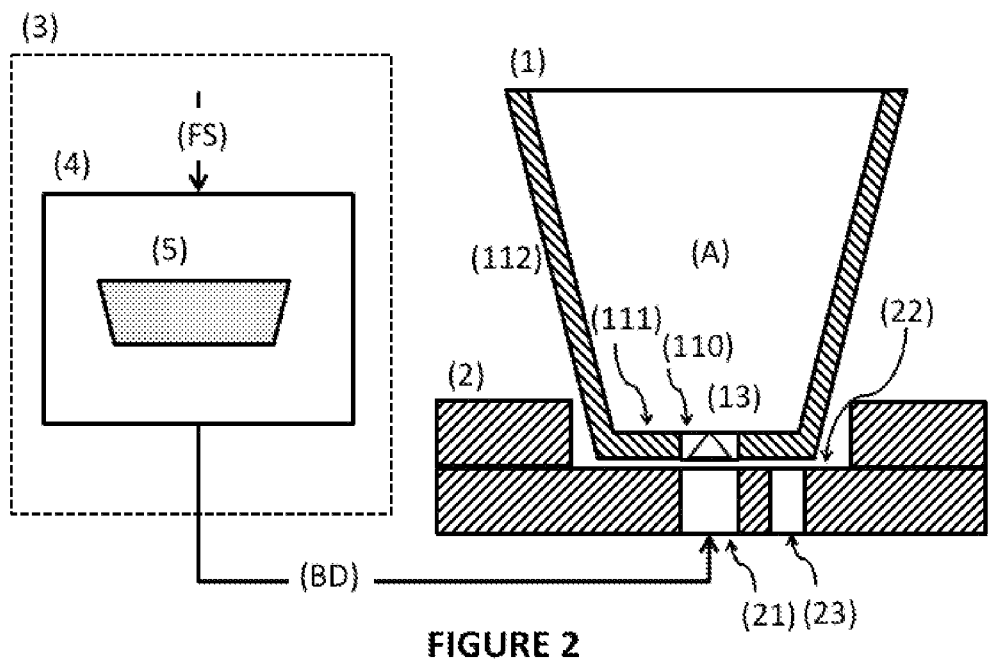
Figure 3:
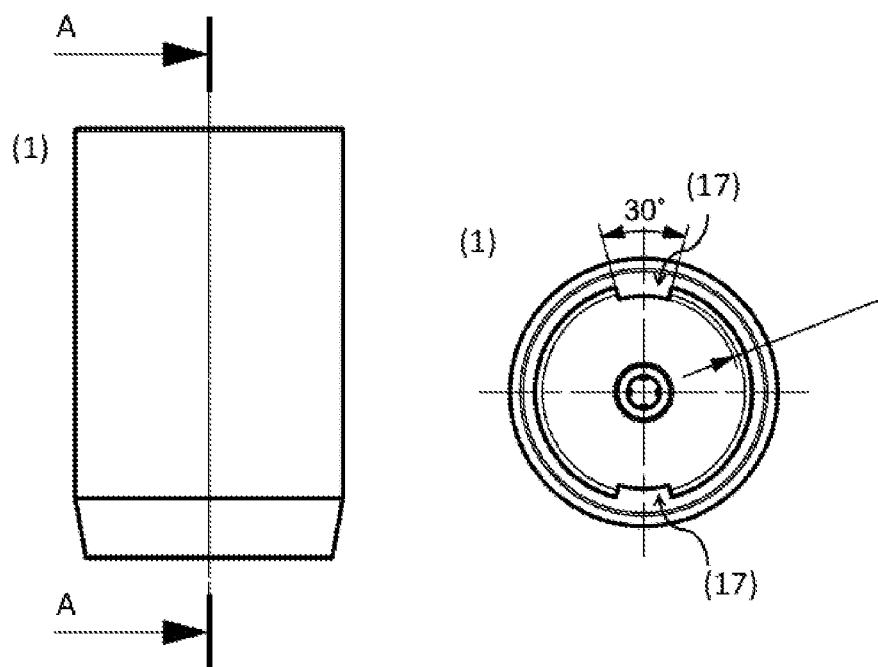
Figure 4:
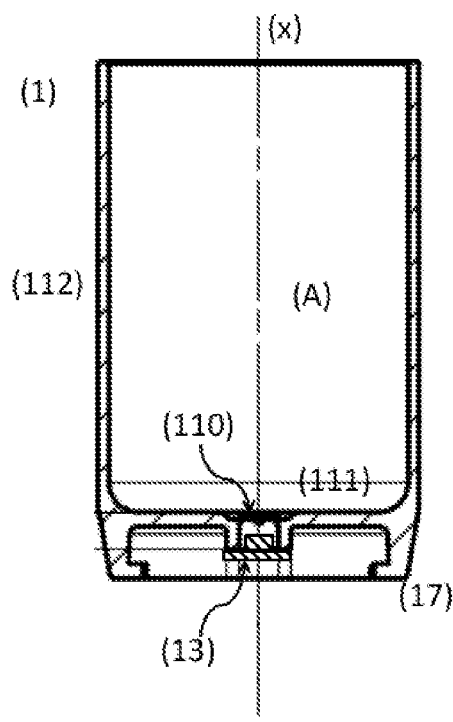
Figure 5:
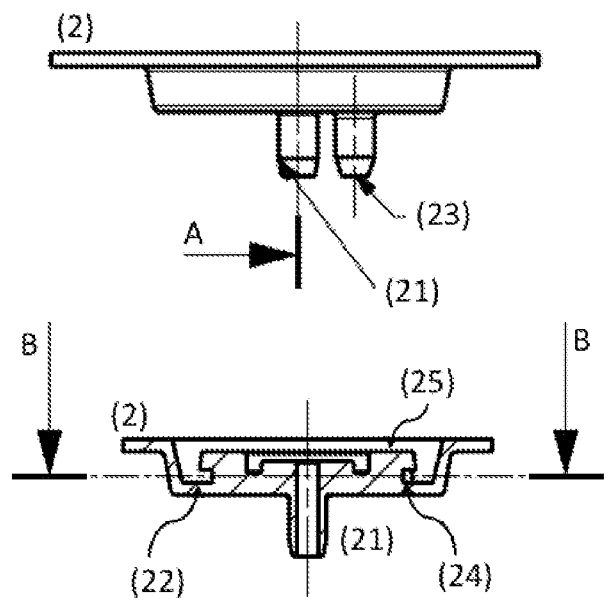
Figure 6:
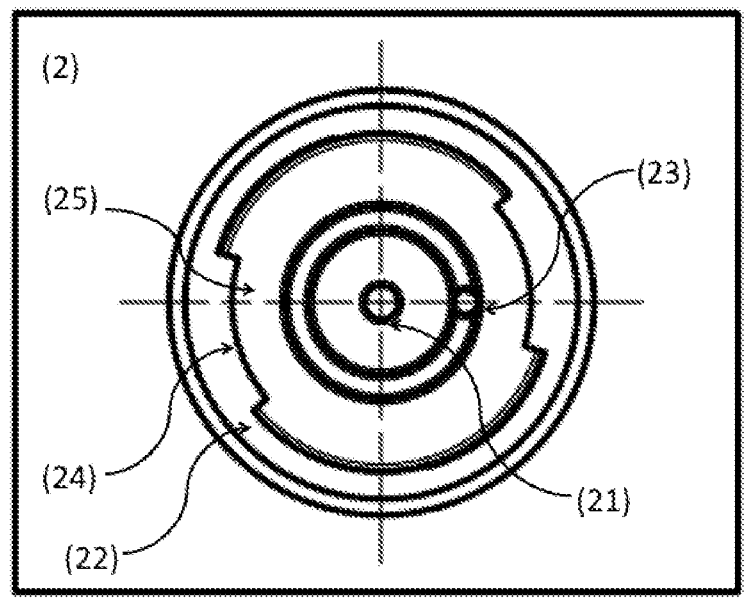
Figure 7:
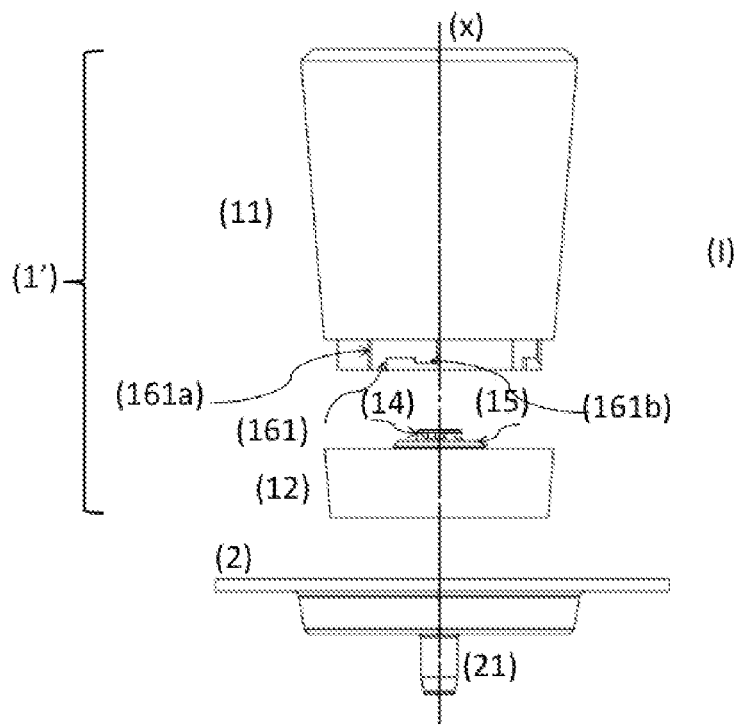
Figure 8:
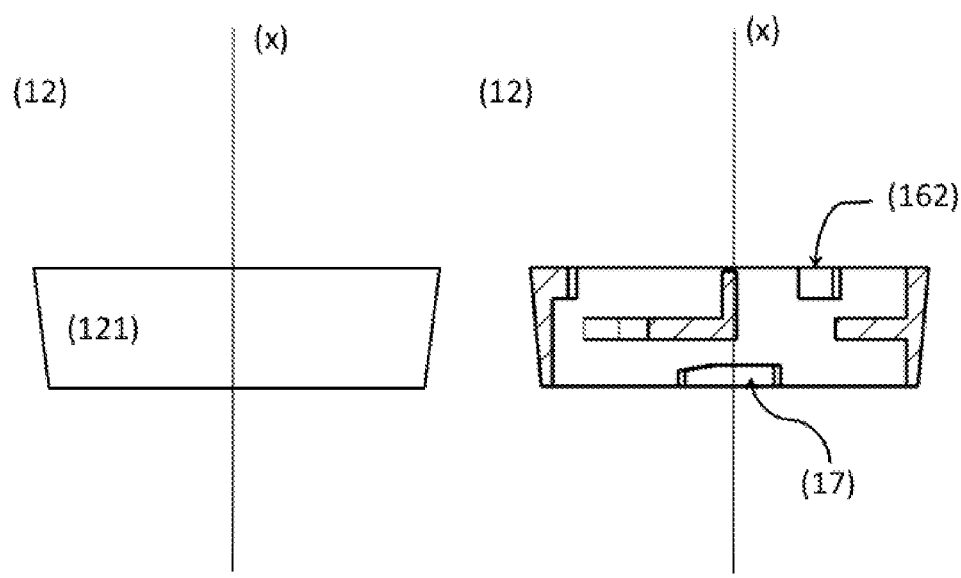
Figure 9:
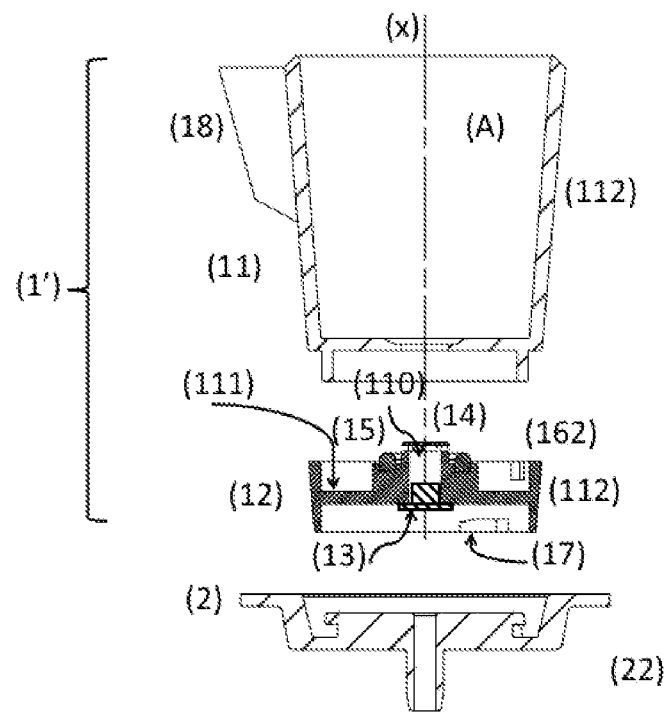
Figure 10:
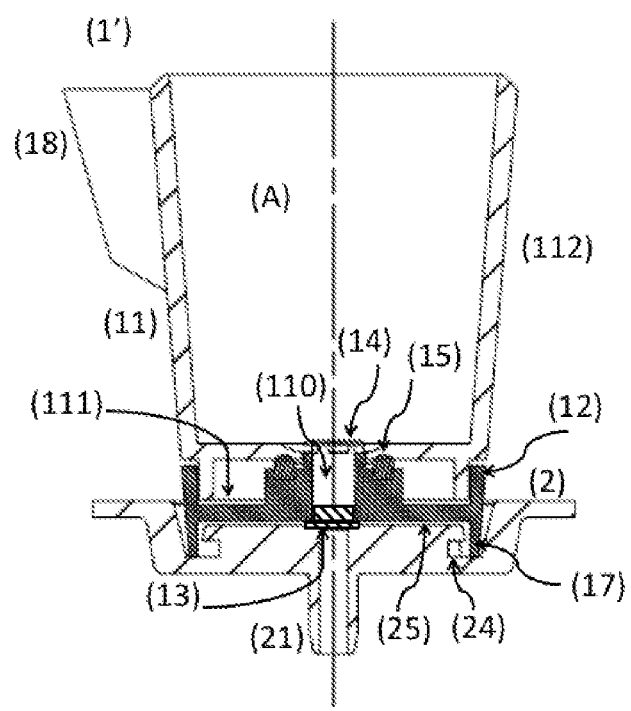
Figure 11:
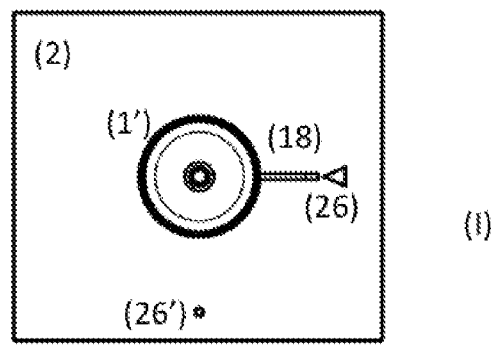
Figure 11:
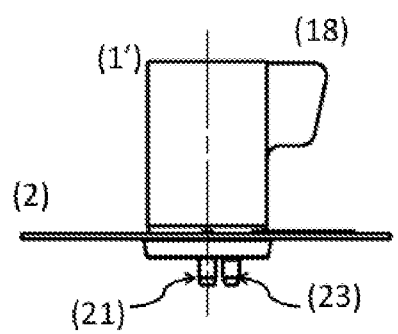
Figure 12:
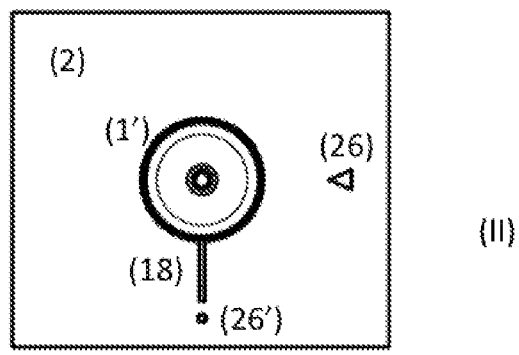
Figure 12:
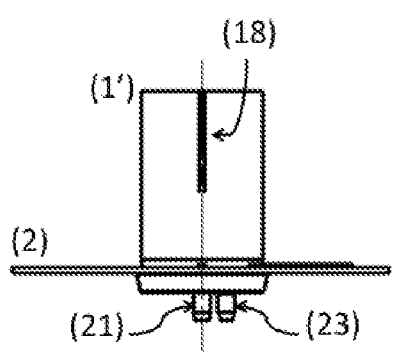
Figure 13:
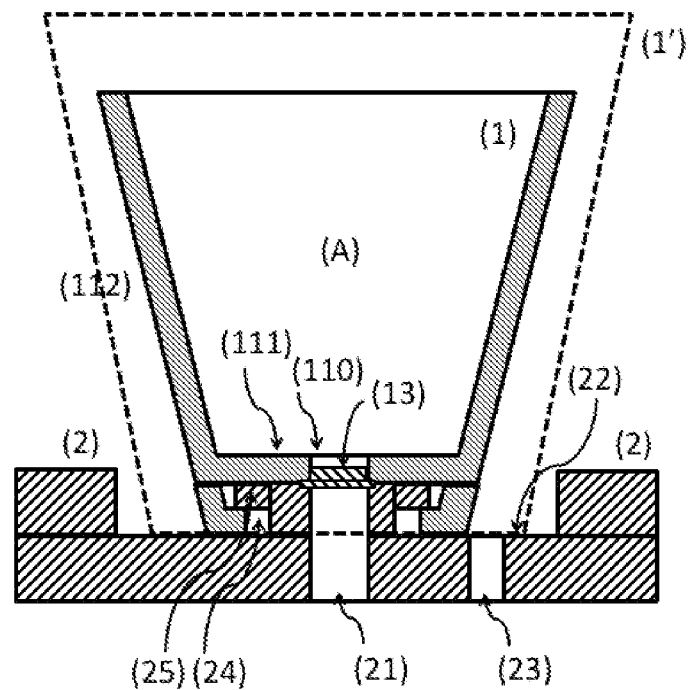
Figure 14:
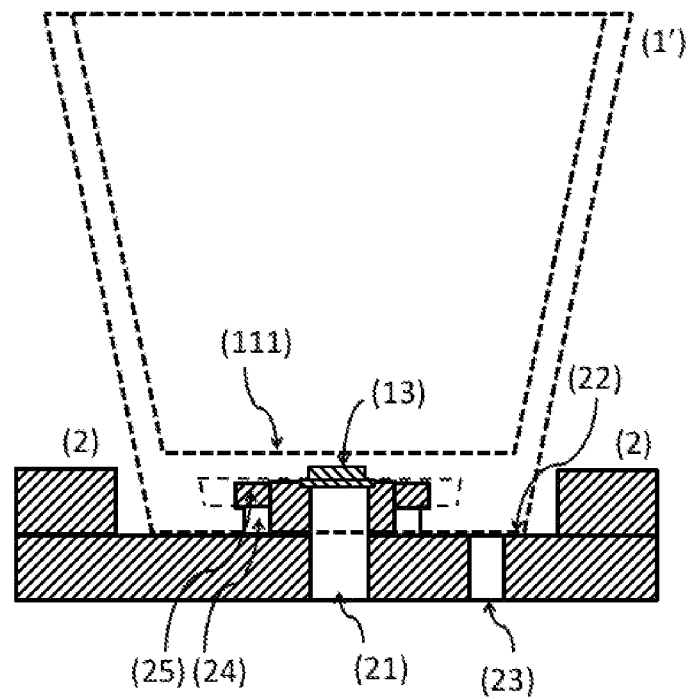
Figure 15:
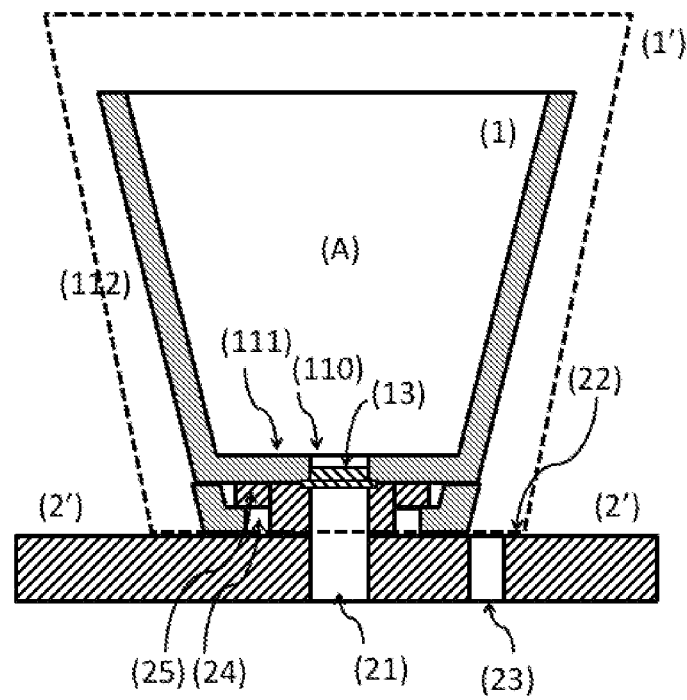
Figure 16:
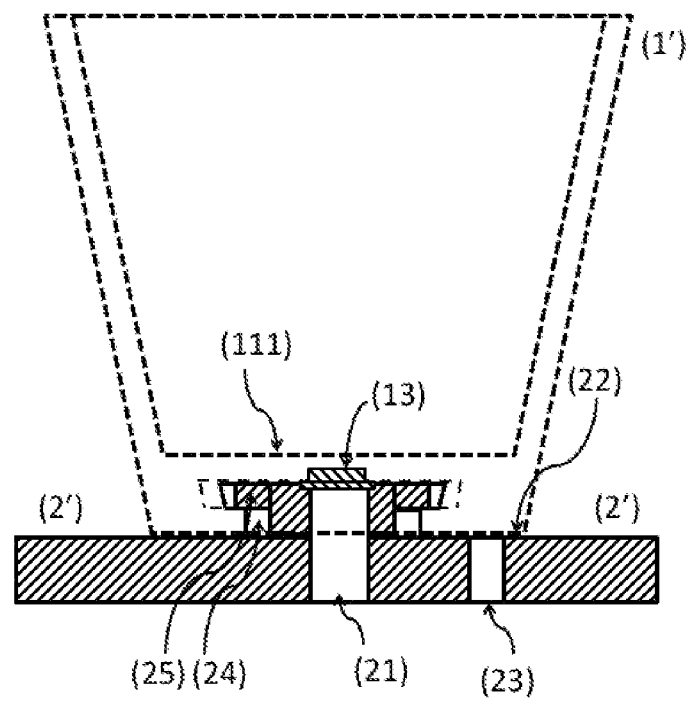

The Figures show, in simplified schematic representations:

FIG. 1: side view of main components of a system according to prior art;

FIG. 2: diagram of a drinking recipient (1) on a beverage discharge support (2) operatively associated in fluid connection to a beverage apparatus (3) of a system according to prior art;

FIG. 3: side (left-side) and base view (right-side) of a first embodiment of a drinking recipient (1) of a system according to the present invention;

FIG. 4: view in respective AA side cut of the embodiment of drinking recipient (1) represented in FIG. 3;

FIG. 5: side (top) and AA side cut view (bottom) of an embodiment of beverage discharge disposition (2);

FIG. 6: top cut view BB of the embodiment represented in FIG. 5;

FIG. 7: side cut of a second embodiment of a drinking recipient (1'), on a disassembled condition, and a beverage discharge disposition (2), of a system according to the present invention;

FIG. 8: side view (left-side) and side cut (right-side) of a second part (12) of the embodiment represented in FIG. 7, of a system according to the present invention;

FIG. 9: side cut view of the embodiment of drinking recipient (1') of FIG. 7, in a disassembled condition, and beverage discharge disposition (2) according to the present disposition;

FIG. 10: side cut view of the embodiment of drinking recipient (1') of FIG. 7, in an assembled condition and placed on a beverage discharge disposition (2) according to the present invention;

FIG. 11: top (on the top) and side view (bottom) of a drinking recipient (1') and beverage discharge disposition (2) in a placement position (I), in a system according to the present invention;

FIG. 12: top (on the top) and side view (bottom) of a drinking recipient (1') and beverage discharge disposition (2) in a retention position (II), in a system according to the present invention;

FIG. 13: side cut view of an embodiment of beverage discharge disposition (2) with indication of retention position of two types of drinking recipients (1') of different dimensions, in a system according to the present invention;

FIG. 14: side cut of the embodiment of FIG. 13, with indication only of the retention position of a second type of drinking recipient (1');

FIG. 15: side cut view of an embodiment of beverage discharge disposition (2) with indication of retention position of two types of drinking recipients (1') of different dimensions, in a system according to the present invention;

FIG. 16: side cut of the embodiment of FIG. 13, with indication only of the position of retention of a second drinking recipient (1').

DETAILED DESCRIPTION OF PREFERRED EMBODIMENTS OF THE INVENTION

FIG. 1 represents side, on the left-hand side, and frontal views, on the right-hand side, of a system for distributing beverages according to prior art.

Said system comprises at least one type of drinking recipient (1, 1'), such as for example a cup or a glass, that presents a base wall (11) comprising a passageway opening (110) and a flow regulation disposition (12), whereby said drinking recipient (1) is adapted so that can be retained on a beverage discharge disposition (2).

Said system comprises a beverage apparatus (3), for example in the form of a machine for preparing espresso coffee and similar aromatic beverages, that presents at least one brewing device (4) provided as interior or exterior part of the casing of said apparatus (3), and so that can collect a portion (5) of edible substance that is precursor of beverage, for example contained in a capsule or similar, and supplied preferentially through an introduction opening (8) disposed for example in the vicinity of said beverage discharge disposition (2).

Moreover, it is preferred when said beverage apparatus (3) includes a fluid reservoir (not represented), as well as a flow pressurization device (7) and a fluid heating device (not represented), so that can supply a flow (FS) at a temperature comprised between 60 and 100° C. and pressure between 1 and 20 bar, preferentially more than 10 bar, so as to interact with said edible substance.

Said discharge flow (BD) is then conducted to an exit of said brewing device (4) and to a beverage discharge disposition (2) arranged downstream thereof and that includes at least one beverage discharge element (21) adapted so that can retain a drinking recipient (1, 1'), preferentially by means of mechanical engagement with the base region (11) thereof.

The system includes a plurality of types of drinking recipients (1, 1') presenting different dimensions, in particular different dimensions, for example diameter, of respective base walls (11), but adapted so as to engage in a same type of beverage discharge disposition (2), whereby at least one of said types of drinking recipients (1, 1') is not a disposable recipient.

As represented in FIG. 2, said types of drinking recipients (1, 1') can present a flow regulation disposition (12), for example of the type one-way valve (symbolically represented by a triangle), provided retained in an opening of passageway (110) of said base wall (11) and adapted so that only provides passageway to a pressurized flow of beverage discharge (BD) downstream, to said collection space (A), in a direction opposite the gravity force, if impinged with a flow pressure bigger than a previously defined value of flow pressure.

According to a particularly relevant aspect, said sidewall (112) of said drinking recipients (1, 1') is devoid of exteriorly-oriented projections on the base region, so that all the recipient retention means are provided inside of a cavity formed by the edge portion of the sidewall (112) that projects beyond said base wall (111).

Taking the embodiment represented in FIGS. 3 to 6 as a reference, and according to a first inventive aspect, said drinking recipients (1, 1') and said beverage discharge disposition (2) are adapted so that said placement position (I) is only provided in one or two previously defined angular extensions of said drinking recipients (1, 1') with relation to said beverage discharge disposition (2).

Said drinking recipient (1, 1') can present one or two recipient retention means (17) that develop along a respective angular extension, corresponding to a segment of perimeter in the interior of said cavity formed on the base region of said drinking recipient (1, 1').

In particular, said recipient retention means (17) can develop outwards, with relation to the longitudinal axis (X), from a first edge wall that surrounds a flow passageway (110), and/or inwards, from a second edge wall that develops along an exterior perimeter of the base region of said drinking recipient (1, 1').

It is further preferred when said beverage discharge disposition (2) presents one or two support retention means (24) that develop on a support central portion (25) surrounding the beverage discharge element (21), along a respective angular extension that is bigger than the angular extensions of said recipient retention means (17), and so that said recipient placement position (I) is only provided along one or two previously defined segments of angular extensions of said recipient placement support (22), where the recipient retention means (17) can pass in-between said support retention means (24), in a downwards movement along an at least approximately vertical direction, and said retention position (II) is provided when are actuated in a rotation movement by at least a given angle around said longitudinal axis (X) from said placement position (I), and vice-versa.

In the case of the embodiment represented in FIGS. 3 and 4, said drinking recipient (1, 1') presents two recipient retention means (17) developing as radial projections, for example of tooth type, along a direction transversal to the gravity force from at least an edge wall of said drinking recipients (1, 1'), and adapted so that provide retention of the drinking recipient (1, 1') by means of a rotation movement by at least a given angle around the longitudinal (X), between a recipient placement position (I) where they can pass between two support retention means (24), and a recipient retention position (II) where they are retained by said support retention means (24), and vice-versa.

This solution advantageously provides greater construction simplicity and better reliability of retention of the drinking recipient (1, 1').

Moreover, as represented in FIGS. 5 and 6, it is preferred when said beverage discharge disposition (2) presents support retention means (24) associated with a support central portion (25) and provided so that said a recipient placement position (I) can only take place along one or two previously defined segments of angular extension of said recipient placement support (22).

It is preferred when said one or two recipient retention means (17) develop along respective angular extensions, each one of at least 10° and up to 50°, preferentially of 20° up to 40°, said one or two support retention means (24) develop along respective angular extensions of at least 90° and up to 160°, preferentially of 110° up to 140°.

This configuration provides that said retention position (II) corresponds to a rotation of said drinking recipient (1, 1') on said recipient placement support (22) around a common longitudinal axis (X), smaller than 110°, preferentially smaller than 90°, from said placement position (I).

It is further preferred when said two support retention means (24) are adapted so that the two placement positions (I) are provided at least approximately mutually opposing, whereby it is preferred when two placement positions (I) are provided at least approximately in the region of transition from a first to a second quadrant, and from a third to a fourth quadrant, with relation to a confining wall of said recipient placement support (22).

It is further preferred when said beverage discharge disposition (2) presents a recipient placement support (22) confined on the outwards side by an exteriorly confining wall and on the inwards side by a support central portion (25), whereby it is preferred when the intercalary space between said exterior and interior confining walls presents a ring-like shape with a free width that is bigger than the thickness of the edge wall of exterior perimeter of the drinking recipient (1, 1') and smaller than the transversal extension of said recipient retention means (17) along part of their extension.

According to another preferred embodiment, said one or two recipient retention means (17) are provided as transversal projections or transversally oriented cavities, and develop as at least one of: outwards from an edge wall of the interior perimeter of said drinking recipient (1, 1'), and preferentially, inwards from an edge wall of exterior perimeter of said drinking recipient (1, 1'), so that the exterior surface of drinking recipient (1, 1') does not present any recipient retention means (17) visible on the exterior surface thereof.

It is further preferred when said one or two support retention means (24) are provided as transversal projections or transversally oriented cavities, configured so as to engage in corresponding recipient retention means (17), and developing as at least one of: inwards from an exteriorly confining wall of said recipient placement support (22), and preferentially, outwards from said support central portion (25) of said recipient placement support (22).

In particular, it is advantageous when on said placement position (I), at least most part at least of the periphery region of said base wall (111) in the vicinity of said support retention means (24), sits upon said beverage discharge disposition (2), in particular upon said support central portion (25).

In terms of the general configuration of the retention of the drinking recipient (1, 1') on the beverage discharge disposition (2), it is further preferred when said support central portion (25) develops in a radial extension from the top region of said beverage discharge element (21), and along a direction transversal to the beverage discharge direction, thereby forming a support plane for the base wall (111) of said drinking recipient (1, 1') around said beverage discharge element, so that on the placement position (I), at least most part at least of the central region of the base wall of drinking recipient (1, 1') sits in surface upon said support plane provided by said support central portion (25), whereby said support plane preferentially develops below of an exterior perimeter surface of said recipient placement support (22).

It is further preferred when at least the exterior surface of said sidewall (112) is provided inclined relative to said longitudinal axis (X), at least in respective base region that is adapted so that can be placed on said recipient placement support (22), whereby it is preferred when the beverage discharge disposition (2) also presents a wall that exteriorly confines said recipient placement support (22), also inclined with relation to said longitudinal axis (X).

According to another advantageous aspect, a central region of a support central portion (25) is provided in recess, preferentially with a transversal dimension that is similar or bigger than the transversal dimension of said exterior portion of said flow regulation means (13), so that the latter can be at least partially collected in said recess around said beverage discharge element (21), and thereby providing sealing of flow with relation to said beverage discharge element (21).

Moreover, said recipient retention means (17) and support retention means (24) are adapted so that, on said retention position (II), said exterior portion of flow regulation means (13) interacts with, preferentially is compressed along the prevailing flow direction by, said beverage discharge disposition (2), preferentially by the upwards-oriented surface of said support central portion (25), thereby providing sealing of flow in the interface of the drinking recipient (1, 1') with the beverage discharge element (21).

Moreover, said recipient retention means (17) and support retention means (24) are provided so that a retention position (II) corresponds to a reduction of level of the drinking recipient (1, 1') relative to the beverage discharge disposition (2) and to the placement position (I), where the flow regulation means (13) are in the vicinity of said beverage discharge disposition (2), said level reduction being only the one enough to thereby exert a compression force upon said flow regulation means (13).

According to a preferred embodiment, said beverage discharge disposition (2) further comprises discharge means (23) of liquid residues provided as at least one discharge opening in fluid communication downwards, disposed in at least one surface developing at least approximately transversally to the beverage discharge direction and around said discharge element (21), including at least one of: a first surface next to said discharge element (21) and said recipient placement support (22), so that eventual rests of beverage injection can be discharged into the interior of said beverage apparatus (3).

FIGS. 7 to 10 represent a second embodiment of drinking recipient (1') of a system according to the present invention.

In particular, the drinking recipient (1) in this case comprises a first and a second recipient parts (11, 12) adapted so that can be assembled together in removable manner, and thereby provided fluid connection through a flow passageway (110) that confines the beverage flow downstream of said flow regulation means (13), and upstream of the entry of beverage flow in the region of the base wall (111) of said collection space (A).

It is preferred when at least one of said first and second recipient parts (11, 12), preferentially said second recipient part (12), comprises said flow passageway (110) that develops in a single direction with one tubular shape presenting a similar transversal section and similar transversal dimension along at least most part of its extension until said entry region of beverage flow, whereby said flow passageway (110) preferentially presents a smaller transversal section at an upstream edge, in particular adapted for retention of said flow regulation means (13), and a bigger transversal section at a downstream edge, in particular adapted for retention of flow sealing means (15), in the proximity of the region of the base wall (111) of said collection space (A).

It is further preferred when said drinking recipient (1) presents only one piece as flow regulation means (13), for example of the type single-way valve, and only one piece as flow sealing means (15), both of which are disposed upstream of the beverage flow entry in the region of the base wall (111) of said collection space (A).

Moreover, it is preferred when at least one of said first and second recipient parts (11, 12), preferentially said second recipient part (12), presents said flow regulation means (13), preferentially disposed in the region of an edge of said flow passageway (110), preferentially in the edge region upstream thereof.

It is further preferred when at least one of said first and second recipient parts (11, 12), preferentially said second recipient part (12), presents flow constraining means (14) provided so that constrain the flow by means of at least one of: a flow impact surface and a reduction of flow passage section, thereby determining the pattern of beverage flow at least in the vicinity of the base wall (111) at the entry of the beverage flow in the base wall region (111) of said collection space (A).

It is further preferred when at least one of said first and second recipient parts (11, 12), preferentially said second recipient part (12), presents flow sealing means (15) retained in the region of interface between said first and second recipient parts (11, 12), whereby said flow sealing means (15) are preferentially adapted so that are compressed in a direction parallel to the prevailing flow direction, around said flow passageway (110), when said first and second recipient parts (11, 12) are assembled together, and are preferentially provided in the form of a sealing ring, for example of "o-ring" type, or similar.

According to a particularly preferred embodiment, said first and second recipient parts (11, 12) are provided in a rigid material, preferentially in different materials including at least one of: a synthetic material, a metallic material, a ceramic material, an at least partially translucent material and an opaque material, whereby it is preferred when at least said second recipient part (12) is produced in a synthetic material.

It is further preferred when at least one of, preferentially both, of said first and second recipient parts (11, 12) present a general configuration of tubular type, including respective sidewalls (112, 121) configuring closed edge alignments in opposite sides, whereby one of said first and second recipient parts (11, 12) presents an edge wall projection (113) with a characteristic dimension, for example an exterior diameter, smaller than a characteristic dimension, for example exterior diameter, of the other recipient part (11, 12), so that can be inserted in the interior of the other.

As represented in FIG. 7, said first and second recipient parts (11, 12) present parts retention means (16; 161, 162) adapted so that provide manually removable retention of said second recipient part (12) in the base region of said first recipient part (11), said parts retention means (16; 161, 162) comprise at least two part retention slots (161) disposed in symmetric manner on a respective edge wall and configured so that guide a first translation movement along a direction parallel to said longitudinal axis (X), a rotation movement around said longitudinal axis (X) and a second translation movement along a direction parallel thereto and in opposite direction to said first translation movement, and whereby said parts retention means (16; 161, 162) are preferentially provided on the outwards-oriented surface of a retention projection portion (113) of one of said recipient parts (11) and on the inwards-oriented surface of the other recipient part (11, 12), so that said parts retention means (16; 161, 162) are not visible when said parts are retained one on the other.

It is preferred when said first and second recipient parts (11, 12) present parts retention means (16; 161, 162) adapted so that provide a blocking position of retention whereby said first and second recipient parts (11, 12) exert a compressing pressure upon flow sealing means (15) along the longitudinal direction (X).

Moreover, it is preferred when one of said first and second recipient parts (11, 12), preferentially said first recipient part (11), presents at least two part retention slots (161) disposed in symmetric manner on a respective edge wall, preferentially on a outwards-oriented surface thereof, whereby said part retention slots (161) comprise a first section (161*a*) developing in a first direction parallel to the longitudinal direction (X), a second section (161*b*) along a second direction at least approximately transversal to said first direction, and a third section (161*c*) along a direction parallel to said first direction and in opposite direction with relation thereto, whereby the other of said first and second recipient parts (11, 12), preferentially said second recipient part (12), presents an equal number of corresponding elements of engagement parts (162) provided so that can engage on said retention slots, preferentially configured in the form of tooth-like projections or similar, in a respective edge wall, preferably in a inwards-oriented surface thereof, whereby said two sections (161*a*, 161*c*) along the longitudinal direction (X) preferentially present an extension of at least 2 and at most 10 mm, and in that said section along the transversal direction presents an extension of at most 15 mm.

Said parts retention means (16; 161, 162) can further include mechanical clipping means by means of elastic deformation (not represented).

It is further preferred when said second recipient part (12) presents a side wall (121) that develops with a tubular shape, and a base portion (122) provided in the interior of said side wall (121) so that confines said flow passageway (110) and so that retains, preferentially by means of pressurized fitting, a flow regulation means (13), preferentially in the form of a single-way valve, on an upstream edge, and flow sealing means (15), preferentially in the form of an "o-ring", or similar, on a downstream edge of the base portion (122), in particular on an interface region with said first recipient part (11).

The drinking recipient (1, 1') presents flow regulation means (13) associated with the portion of base wall (112) that confines said recipient retention means (17), and that can be provided as at least one of:
  a pressure-driven device, for example a single-way valve, retained preferentially by means of pressurized fitting on an edge of said flow passageway connection (110);
  a disposition of micro-holes provided upstream, preferentially in the vicinity, of the entry region of beverage flow in the region of the base wall (111) of said collection space (A).

Moreover, the drinking recipient (1) can comprise flow constrain means (14) that present at least one flow impact surface that develops along one transversal direction and an oblique direction, with relation to said prevailing flow direction, whereby said flow constrain means (14) configure a preferentially plurality of flow passageways along a closed alignment, preferentially at least in the entry region of beverage flow in the region of the base wall (111) of said collection space (A).

According to another particularly advantageous aspect, represented in FIGS. 8 and 9, at least one of said recipient retention means (17) and support retention means (24) are provided so that a retention position (II) can be reached from a placement position (I) along only one rotation direction, whereby said rotation direction towards the retention position (II) is preferentially the clockwise direction.

It is further preferred when at least one of said recipient retention means (17) and support retention means (24) is provided so that a rotation position (II) further includes a retention of type pressurized fitting of said recipient retention means (17) on the support retention means (24), whereby said retention of type pressurized fitting is preferentially associated to the rotation movement between the placement (I) and retention position (II).

In particular, it is preferred when said one or two recipient retention means (17) present at least one first edge along the respective extension transversal to said longitudinal axis (X), that presents a smaller first transversal section and that increases at least along the direction parallel to said longitudinal axis gradually until a second transversal section of said recipient retention means (17), thereby presenting a wedge shape or similar, so that the retention position (II) is further provided by an engagement of pressurized-fitting type of said recipient retention means (17) on said support retention means (24).

The retention of the drinking recipient (1, 1') is thus provided by a first engagement that acts mostly along the direction of the longitudinal axis (x), retaining the drinking recipient (1, 1') against the force exerted by the beverage discharge flow (BD), and a second engagement of pressurized fitting type that acts substantially along the angular direction, preventing the drinking recipient (1, 1') from vibrating or that may rotate during the injection of said beverage discharge flow (BD). Moreover, this second engagement conveys a haptic perception to the user as to the sufficient retention of the drinking recipient in a retention position (II) and, preferentially, also as to a preferential direction, of less resistance, of rotation of the drinking recipient (1, 1') towards the retention position (II).

FIGS. 11 and 12 show another embodiment of the present invention.

In this case, at least one of said first and second parts (11, 12) presents a recipient reference (18) provided so that is perceptible by a user at least visually, preferentially also in tactile manner, and that references at least one angular position of the drinking recipient (1, 1') that provides a placement position (I) on said beverage discharge disposition (2), in particular with relation hereto, whereby it is preferred when said recipient reference (18) is provided as at least one of: an indicia and a constructive portion associated with said drinking recipient (1, 1').

It is herewith advantageously provided that a user can readily recognize in which position to place the drinking recipient (1, 1') in a beverage discharge disposition (2), despite the retention means not being visible.

It is further preferred when said beverage discharge disposition (2) presents at least one placement reference (26, 26') provided so that is perceptible by a user at least visually, preferentially also in tactile manner, whereby at least one first placement reference (26) references an angular position that provides a placement position (I) of said drinking recipient (1, 1') on said beverage discharge disposition (2), and preferentially a second placement reference (26') that references at least an angular position that provides a retention position (II) of said drinking recipient (1, 1') on said beverage discharge disposition (2), whereby it is preferred when said placement reference (26, 26') is provided as at least one of: an indicia, an information display and a constructive portion associated with said beverage discharge disposition (2).

In this particular, by means of said placement references (26, 26') an apprehensible indication can be provided to the user that the drinking recipient (1, 1') has been placed in the support on a first instant, and that has been then correctly retained on a second instant.

It has been further proven as advantageous, when said first and second recipient parts (11, 12) present respective parts and recipient retention means (16, 17) provided so that can be manually actuated in similar manner, including preferentially by means of a rotation movement around the longitudinal axis (X) along an extension smaller than 110°, preferentially smaller than 80°.

FIGS. 13 and 14 show a first, and 15 and 16 show a second of two preferred embodiments of the beverage discharge disposition (2) so as to provide operative retention of drinking recipients (1, 1') of different dimension. In particular, in the case of a first embodiment, said discharge element (21) including at least part of the injection device and retention means, is provided with relation to the recipient placement support (22) so that results at least partially, preferentially completely, inside of a cavity of relatively proximal dimensions, whereas in the case of a second embodiment such does not take place, so that the recipient placement support (22) can coincide with an exterior surface of said beverage discharge disposition (2).

As represented, it is preferred when at least the exterior surface of said side wall (111) is provided inclined relative to said longitudinal axis (X), at least in the respective base region that is adapted so that can be placed on said recipient placement support (22), whereby it is further preferred when the beverage discharge disposition (2) also presents a wall that externally confines said recipient placement support (22), also inclined with relation to said longitudinal axis (X). This configuration favours the placement of the drinking recipient (1, 1') in the beverage discharge disposition.

FIGS. 15 and 16 represent an embodiment of a second type of beverage discharge disposition (2) whereby the recipient placement support (22) is not provided as a cavity, but rather in the same plane of an exterior wall, interior or exterior, of said beverage apparatus (3).

Said beverage discharge disposition (2) can further comprise discharge means (23) of liquid residues provided as at least one discharge opening with fluid communication downwards, disposed in at least one surface developing at least approximately transversally to the beverage discharge direction and around said discharge element (21), including at least one of: a first surface next to said discharge element (21) and to said recipient placement support (22), so that eventual rests of beverage injection can be discharge to the interior of said beverage apparatus (3).

The invention claimed is:

1. A system for the preparation of beverages comprising:
    at least one type of drinking recipient comprising a base wall having a flow regulation device that is a single-way valve, a sidewall that develops upwards confining a beverage collection space and a top opening around a longitudinal axis (X), and a recipient retention device that is formed by a radial projection extending toward the longitudinal axis or a radially oriented cavity, the retention device located below the base wall;
    at least one type of beverage apparatus presenting a beverage discharge comprising a beverage discharge element configured to discharge a flow in a direction opposite that of the gravitational force, and a recipient placement support including a support retention device that is formed by a radial projection extending away from the longitudinal axis or a radially oriented cavity complementary to the recipient retention device and thereby configured to engage the recipient retention device,
    whereby said recipient and support retention device is provided along a direction transverse to the direction of the flow from the beverage discharge element and in a reciprocal engagement configuration and are adapted to provide retention of said drinking recipient by a rotational movement of the drinking recipient around said longitudinal axis, between a recipient placement position (I) on said recipient placement support and a recipient retention position (II) where the drinking recipient is retained by said support retention device;
    wherein
    said drinking recipient and said beverage discharge are adapted so that at least one of the following exists:
        said drinking recipient can only be disposed on said placement position (I) in one or two previously defined angular positions with relation to said beverage discharge, and
        on said placement position (I), at least part of the base wall sits upon said beverage discharge at least along an extension that surrounds said flow regulation device, along a direction orthogonal to the direction of the flow from the beverage discharge element; and
            wherein the recipient placement support comprises an outer circumferential wall having a distal upper rim and a support central portion located in a central region of the recipient placement support interior to the outer circumferential wall and recessed below the distal upper rim, and wherein at least a portion of the support central portion provides a leak-tight seal with the flow regulation device when the recipient is in the recipient retention position; and
            wherein the support central portion comprises a horizontal support surface recessed below the distal upper rim, the horizontal support surface lying in a plane above the support retention device and extending radially to a radial perimeter of said support central portion.

2. The system according to claim 1, wherein
    the flow regulation device is retained in a stationary manner on a region upstream of a flow passageway so that an exterior portion of the flow regulation device extends outwardly along a direction generally transverse to the direction of the flow from the beverage discharge element, and is adapted to provide flow sealing with relation to said beverage discharge element,
    and
    said recipient retention device and support retention device are adapted so that, on said retention position (II), said exterior portion of flow regulation device interacts with and is compressed along the prevailing flow direction by said beverage discharge, by an upwards-oriented surface of said support central portion, thereby providing sealing of flow in the interface of the drinking recipient with the beverage discharge element, and said recipient retention device and support retention device are provided so that a retention position (II) corresponds to a reduction of level of the drinking recipient relative to the beverage discharge and to the placement position (I), where the flow regulation device are in the vicinity of said beverage discharge, said level reduction being only enough to thereby exert a compression force upon said flow regulation device.

3. The system according to claim 1, wherein said drinking recipient presents one or two of the recipient retention device that develop inside a cavity confined above by a free surface of said base wall, from an edge region and along a respective angular extension, corresponding to a segment of perimeter of an edge portion of the sidewall on the base region of said drinking recipient, and said beverage discharge presents one or two of the support retention device that extend along a respective angular arcs that are bigger than respective corresponding angular arcs of the recipient retention device, and so that said recipient placement position (I) is only provided along one or two previously defined segments of angular extension of said support central portion, where the recipient retention device can pass between said support retention device, in a downwards movement along an at least approximately vertical direction, and said retention position (II) is achieved following rotational movement by at least a given angle around said longitudinal axis (X) from said placement position (I).

4. The system according to claim 3, wherein
said one or two recipient retention devices develop along respective angular extensions, each one of at least 10° and up to 50°, and
said one or two support retention devices develop along respective angular extensions of at least 90° and up to 160°,
so that said retention position (II) corresponds to a rotation movement of said drinking recipient on said recipient placement support around said longitudinal axis (X), smaller than 110° from said placement position (I), and vice-versa in a rotation movement in the opposite direction.

5. The system according to claim 1, wherein
at least one of said recipient retention device and support retention device is provided so that a retention position (II) can be reached from a placement position (I) only along one rotation direction.

6. The system according to claim 1, wherein
at least one of said recipient retention device and support retention device is provided so that a rotation position (II) further includes a retention of type pressurized fitting of said recipient retention device on the support retention device, whereby said retention of type pressurized fitting is associated to the rotation movement between the placement (I) and retention position (II) that provides a user with an increasing resistance to the rotation movement.

7. The system according to claim 1, wherein
said recipient retention device present at least one first edge along respective extension transversal to said longitudinal axis (X), that presents a first transversal section that is smaller and that gradually increases at least along the direction parallel to said longitudinal axis until a second transversal section of said recipient retention device, thereby presenting a wedge shape or similar, so that the retention position (II) is further provided by an engagement of type pressurized fitting of said recipient retention device on said support retention device.

8. The system according to claim 1, wherein
said recipient retention device and support retention device are adapted so that the angular positions that provide a placement position (I) are provided, with relation to said recipient placement support, as at least one of:
at least approximately in one of the second and third quadrants;
at least approximately mutually opposing;
in different quadrants;
in adjacent quadrants;
in a same quadrant.

9. The system according to claim 1, wherein
said beverage discharge presents a recipient placement support confined on the outwards side by an exteriorly confining wall and on the inwards side by the support central portion, whereby when the space between said exterior and interior confining walls presents a ring-like shape with a free width that is bigger than the thickness of the edge wall of exterior perimeter of the drinking recipient and smaller than the transversal extension of said recipient retention device along part of their extension.

10. The system according to claim 1, wherein
said recipient retention device develops as at least one of:
outwards from an edge wall of the interior perimeter of said drinking recipient associated with the passageway opening,
inwards from an edge wall of exterior perimeter of said drinking recipient, so that the exterior surface of drinking recipient does not present any recipient retention device visible on the exterior surface thereof.

11. The system according to claim 1, wherein
said support retention device is configured so as to engage in corresponding recipient retention device, and developing as at least one of:
inwards from an exteriorly confining wall of said recipient placement support, and
outwards from the support central de portion of said recipient placement support, and on said placement position (I), at least most part at least of the peripheral region of said base wall in the proximity of said support retention device, sits upon said beverage discharge upon the support central portion.

12. The system according to claim 1, wherein
the support central portion develops in a radial extension from the top region of said beverage discharge element, and along a direction transversal to the beverage discharge direction, thereby forming the support surface for the base wall of said drinking recipient around said beverage discharge element, so that on in the placement position (I), at least most part at least of the central region of the base wall of drinking recipient sits in surface upon said support surface provided by said support central portion, whereby said support surface develops below of an exterior perimeter surface of said recipient placement support, and
at least the exterior surface of said sidewall is provided inclined relative to said longitudinal axis (X), at least in respective base region that is adapted so that can be placed on said recipient placement support, whereby it is preferred when the beverage discharge also presents a wall that exteriorly confines said recipient placement support, also inclined with relation to said longitudinal axis (X).

13. The system according to claim 1, wherein
said drinking recipient presents a recipient reference provided so that is perceptible by a user at least visually and references at least one angular position of the drinking recipient that provides a placement position (I) on said beverage discharge, in particular with relation hereto, whereby it is preferred when said recipient reference is provided as at least one of: an indicia and a constructive portion associated with said drinking recipient.

14. The system according to claim 1, wherein
said beverage discharge presents at least one placement reference provided so that is perceptible by a user at least visually, whereby at least one first placement reference references an angular position that provides a placement position (I) of said drinking recipient on said beverage discharge, and a second placement reference that references at least an angular position that provides a retention position (II) of said drinking recipient on said beverage discharge, whereby it is preferred when said placement reference is provided as at least one of: an indicia, an information display and a constructive portion associated with said beverage discharge.

15. The system according to claim 1, wherein
comprises at least one of:
two types of drinking recipients presenting at least one of: different materials, different dimensions of collection space (A), different number of component pieces and different flow regulation device,
two different types of beverage discharge,
whereby said two type of drinking recipients present similar retention devices, and said two types of drinking recipients present different recipient references.

16. A process of beverage preparation, comprising the following steps:
providing a beverage distribution system according to claim 1;
placing a drinking recipient upon a beverage discharge in a placement position (I) corresponding to a previously defined angular position with relation to the beverage discharge, so that a recipient reference is at least approximately aligned with a placement reference provided on said beverage discharge;
rotating said drinking recipient by at least 15°, around said longitudinal axis (X) until reaching a retention position (II) on said beverage discharge, at which a portion of said flow regulation device is thereby compressed, along the direction of said longitudinal axis (X), against the support central portion;
injecting a beverage discharge flow (BD) through said beverage discharge as a result of the injection of a pressurized flow (FS) to a brewing device and with a flow pressure that is bigger than the pressure necessary for flowing through said flow regulation device;
rotating said drinking recipient in the reverse direction in the reverse clockwise direction, so as to progress back to said placement position (I).

17. The process according to claim 16, wherein further includes the step of displaying a signal to a user associated at least with holding of said retention position (II) of said drinking recipient on the beverage discharge.

18. The process according to claim 16, further comprising the steps of:
retaining in removable manner said first and second recipient parts in an assembled condition, including by means of:
aligning an edge part of one of said recipient parts with an edge part of the other of said recipient parts, inserting a projecting part of an edge of one of said recipient parts in an opening part of edge of the other of said recipient parts, so as to align the initial positions of respective retention device of said recipient parts;
rotating at least one of said recipient parts around said longitudinal axis (X), by at least 10° and at most 100° and along a previously defined first direction, thereby progressing to a retention position of said recipient parts in an assembled condition.

19. The process according to claim 16, wherein
the retention of said first and second parts on an assembled condition further includes the steps:
pressing said recipient parts one against the other, before of said movement of rotating around said longitudinal axis (X), thereby elastically compressing said sealing means;
releasing said recipient parts at the end of said rotation movement, so that the latter spread apart under the action of the elastic force of the sealing means, thereby reaching the retention position of said recipient parts.

20. The system according to claim 1, wherein the beverage apparatus is a machine for preparing espresso coffee.

* * * * *